(No Model.) 7 Sheets—Sheet 1.

F. C. SCHMIDT.
AUTOMATIC SCALE.

No. 455,120. Patented June 30, 1891.

Witnesses:
J. A. Rutherford
Geo. W. Rea.

Inventor:
Friedrich C. Schmidt
By James L. Norris.
Attorney.

(No Model.) 7 Sheets—Sheet 2.

F. C. SCHMIDT.
AUTOMATIC SCALE.

No. 455,120. Patented June 30, 1891.

Witnesses:—
J. A. Rutherford.
Geo. W. Rea.

Inventor:
Friedrich C. Schmidt,
By James L. Norris.
Attorney.

(No Model.)

7 Sheets—Sheet 3.

F. C. SCHMIDT.
AUTOMATIC SCALE.

No. 455,120.

Patented June 30, 1891.

Witnesses:—
J. A. Rutherford
Geo. W. Rea.

Inventor:
Friedrich C. Schmidt,
By James L. Norris.
Attorney.

(No Model.)

7 Sheets—Sheet 4.

F. C. SCHMIDT.
AUTOMATIC SCALE.

No. 455,120.

Patented June 30, 1891.

(No Model.)

7 Sheets—Sheet 5.

F. C. SCHMIDT.
AUTOMATIC SCALE.

No. 455,120.  Patented June 30, 1891.

Witnesses:
J. A. Rutherford
Geo. W. Rea

Inventor:
Friedrich C. Schmidt
By James L. Norris
Attorney (No Model.) 7 Sheets—Sheet 6.
F. C. SCHMIDT.
AUTOMATIC SCALE.
No. 455,120. Patented June 30, 1891.
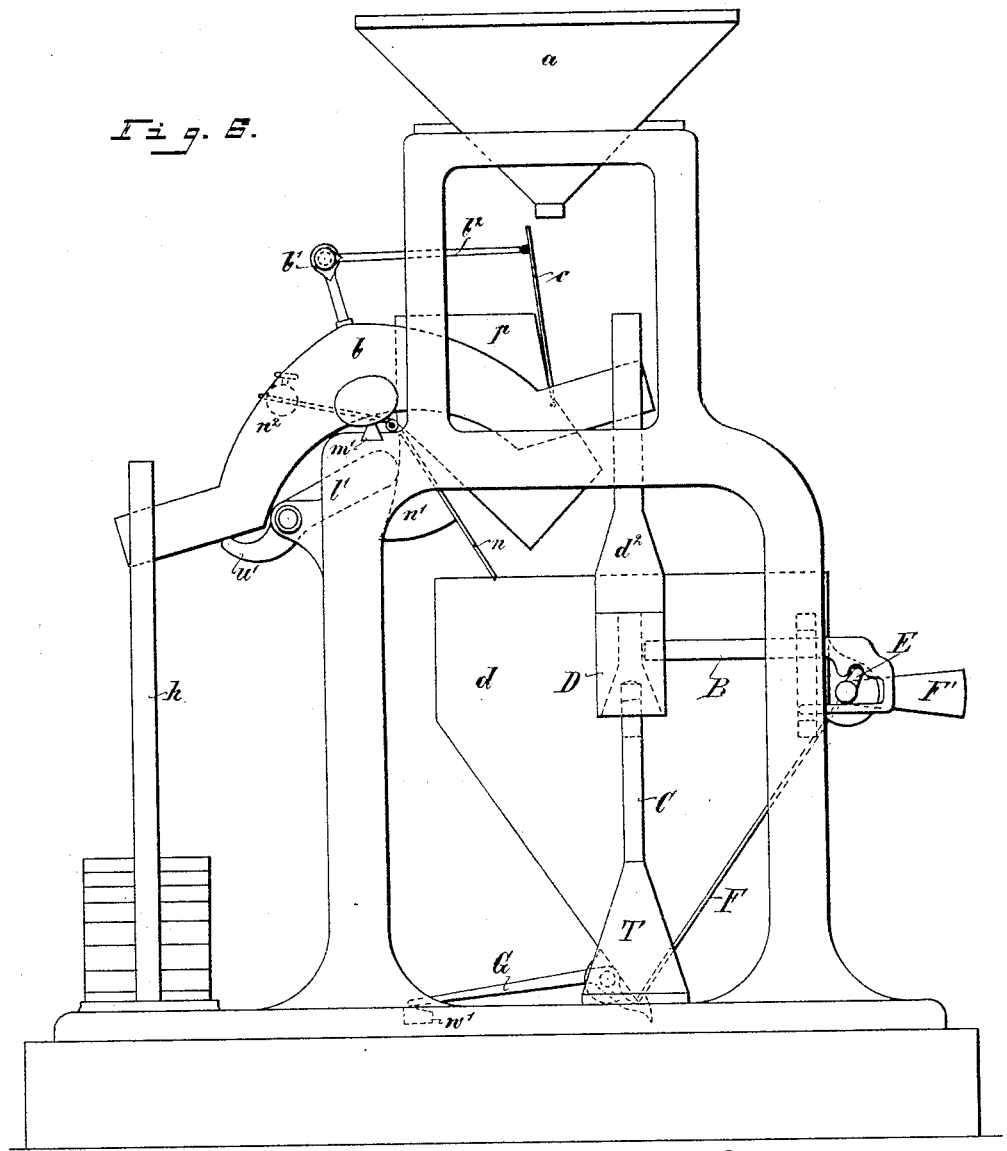

(No Model.)  7 Sheets—Sheet 7.
F. C. SCHMIDT.
AUTOMATIC SCALE.

No. 455,120. Patented June 30, 1891.

UNITED STATES PATENT OFFICE.

FRIEDRICH CARL SCHMIDT, OF BERLIN, ASSIGNOR TO THE MÜHLENBAUANSTALT UND MASCHINENFABRIK, VORMALS GEBRÜDER SECK, OF DRESDEN, GERMANY.

AUTOMATIC SCALE.

SPECIFICATION forming part of Letters Patent No. 455,120, dated June 30, 1891.

Application filed January 31, 1891. Serial No. 379,812. (No model.) Patented in Germany July 23, 1890, No. F 4,889, II, 42.

*To all whom it may concern:*

Be it known that I, FRIEDRICH CARL SCHMIDT, of Berlin, in the Kingdom of Prussia and German Empire, have invented a certain new and useful Improvement in Automatic Scales, (for which I have obtained Letters Patent in Germany July 23, 1890, No. F 4,889, II, 42,) of which the following is a specification, reference being had to the accompanying drawings and to the letters of reference marked thereon.

This invention relates to automatic scales for weighing corn, flour, and other materials; and the object of the said invention is to provide for determining the weight of such materials in an automatic and at the same time continuous manner by means of an oscillating plate changing its position at intervals by means of the oscillating action of the scale-beam, the said oscillating plate directing the said material from a suitable hopper into the raised scale-bucket and into an auxiliary receptacle alternately, the material being fed into the said receptacle when the scale-bucket is being emptied, and the material thus accumulated within the latter being afterward transferred to the said scale-bucket.

The said invention also relates to the details of constructing and the arrangement of the several parts of the said automatic scales, as will be hereinafter more fully described.

Figure 1:
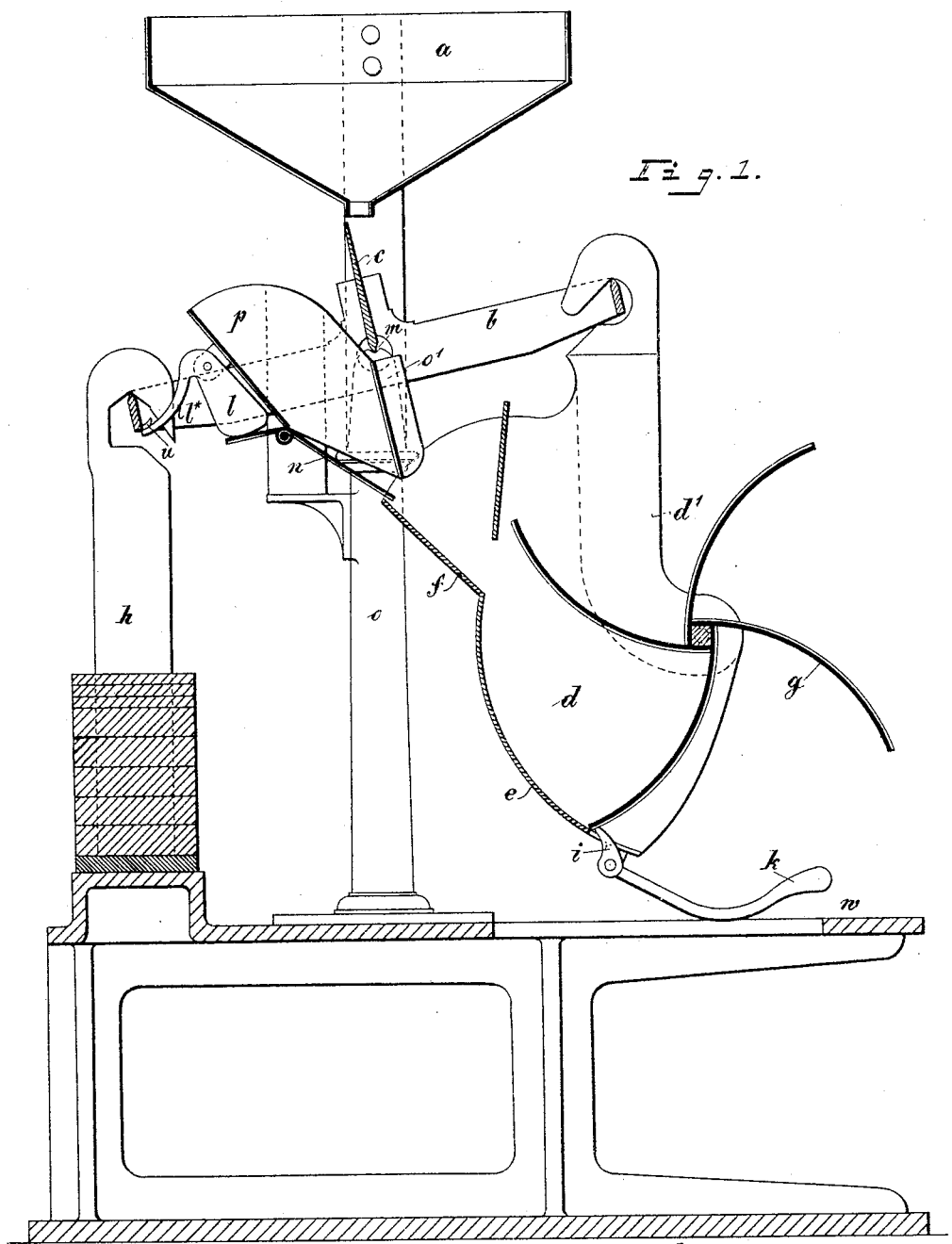
Figure 2:
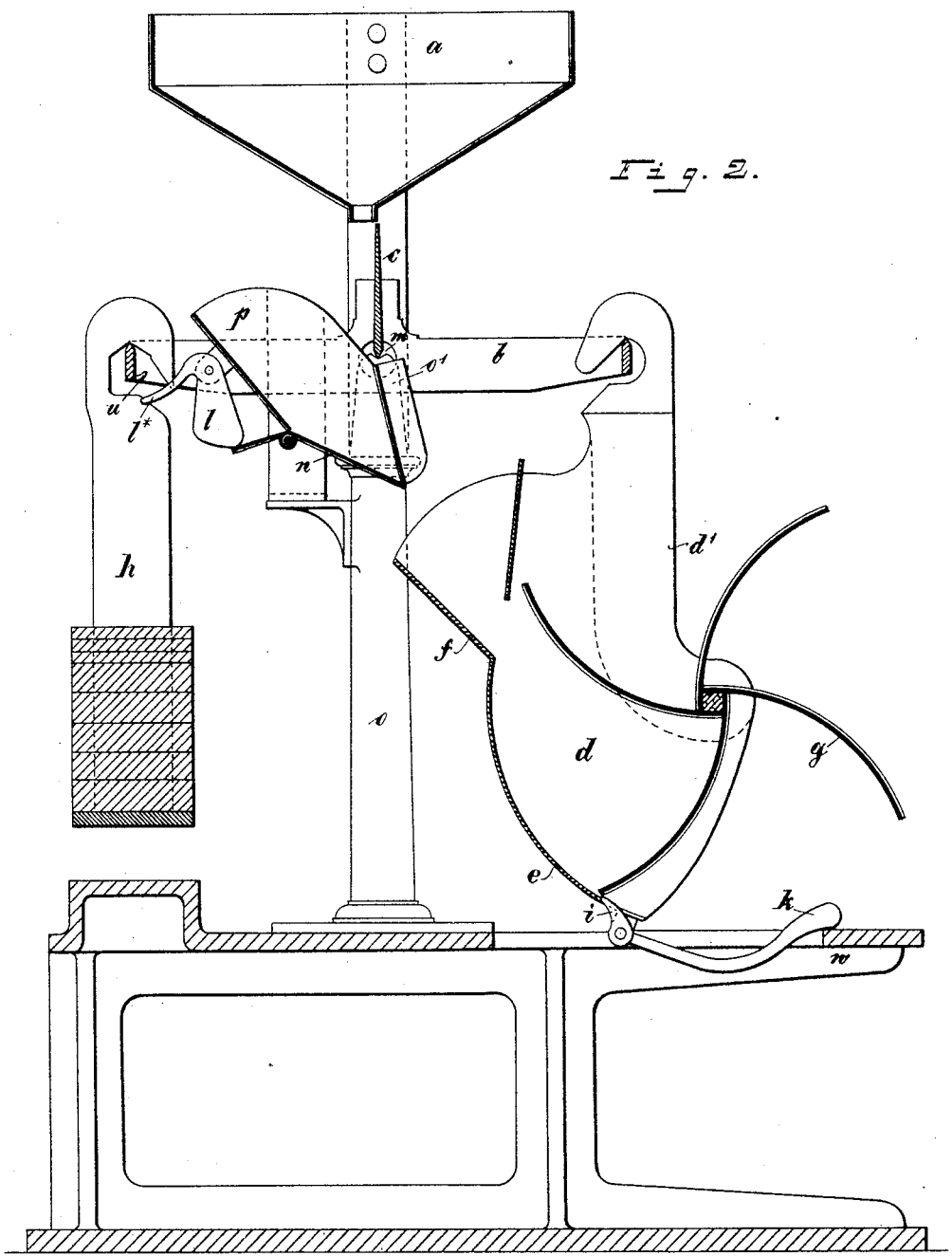
Figure 3:
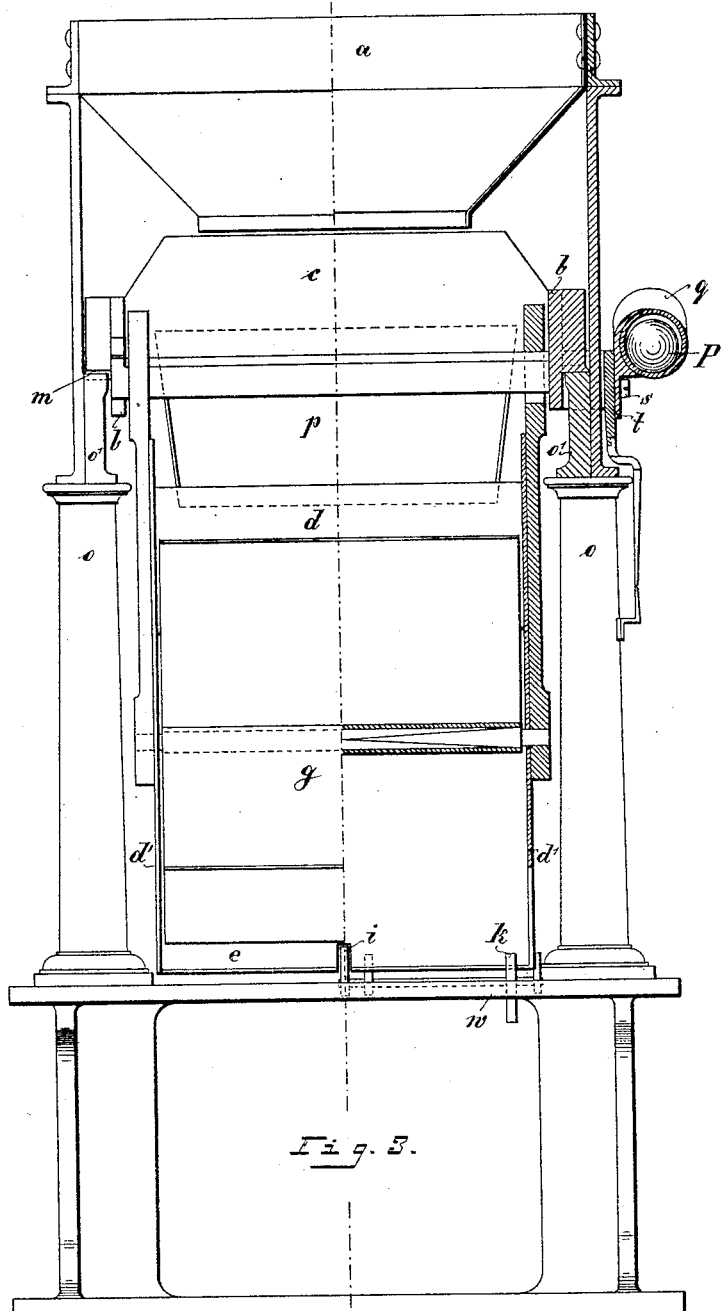
Figure 4:
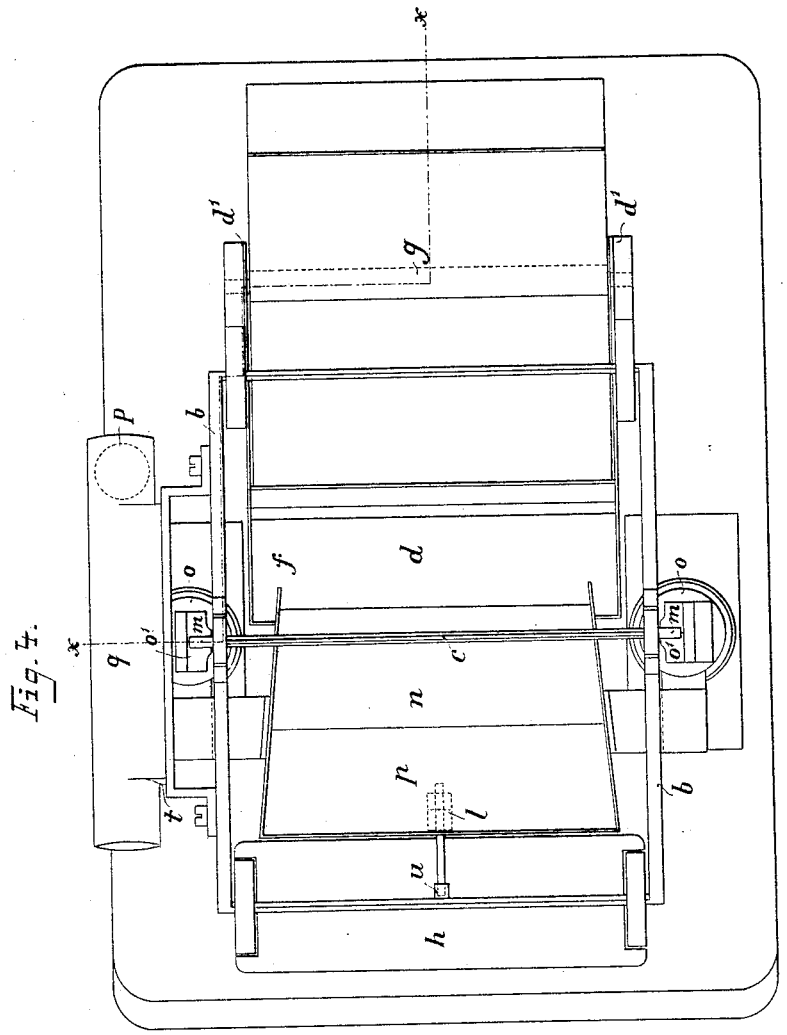
Figure 5:
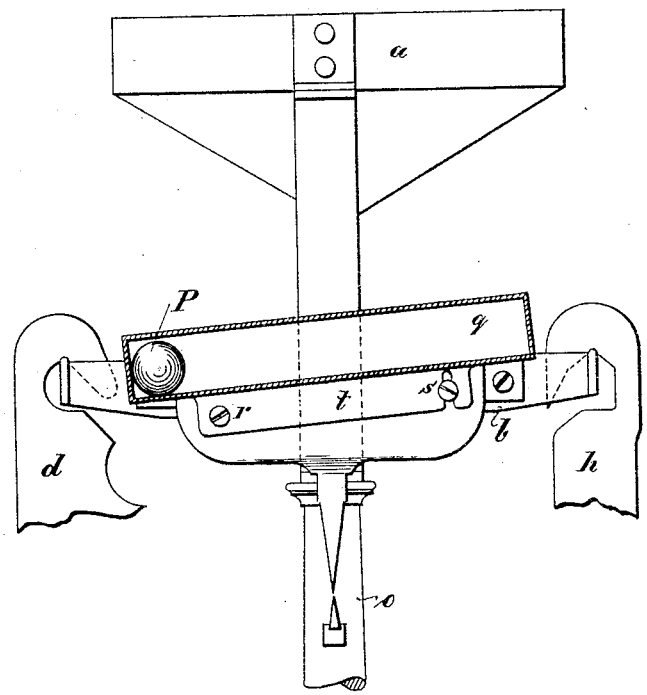
Figures 8, 9:
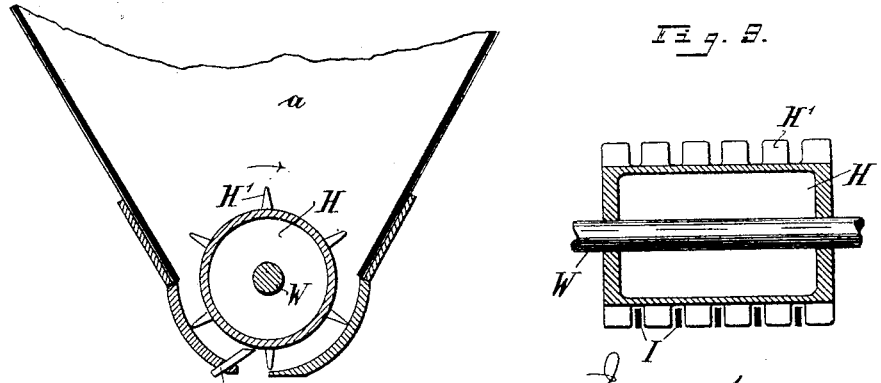
Figure 7:
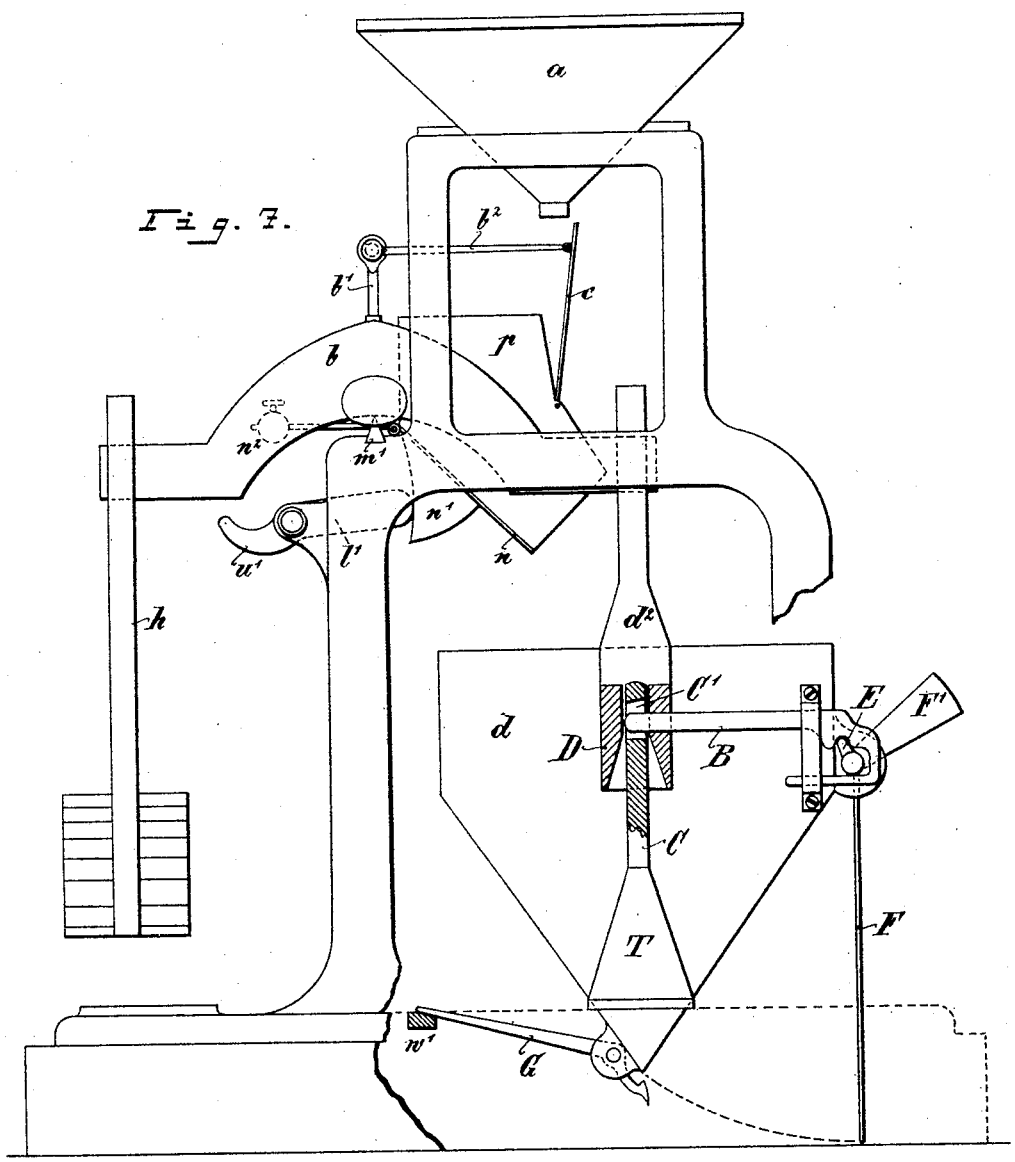

In the accompanying drawings, Figure 1 is a vertical transverse section of the improved automatic scales, showing the parts in the position they occupy when the scale-bucket is being filled from the hopper. Fig. 2 is a similar view showing the weights raised and the scale-bucket depressed and cut off from the hopper. Fig. 3 is a front view, partly in section, taken on the line x x, Fig. 4. Fig. 4 is a top view, partly in section. Fig. 5 illustrates a detail. Fig. 6 is a side view of a modified form of the automatic scales with the parts in the same position as those shown in Fig. 1. Fig. 7 is a similar view to Fig. 6, partly broken away and in section, but showing the parts in the same position as shown in Fig. 2; and Figs. 8 and 9 illustrate means used in combination with the hopper for use in weighing flour or other similar adhesive material.

The apparatus consists of a suitable framework, preferably of cast-iron, or it may be of other metal, for supporting the operating parts of the improved automatic scales.

$a$ is a hopper, which is to be kept filled from any suitable source and in any convenient and well-known manner with the corn, flour, or other material to be weighed. When the apparatus is started, the parts are in the position shown in Fig. 1, the weights $h$ being depressed and the scale-bucket $d$ raised. While in this position the material from the hopper $a$ will be directed into the scale-bucket $d$ by means of a plate $c$, rigidly connected with the scale-beam $b$ and being of a width of not less than the length of the outlet-opening of the hopper $a$, Fig. 3. The scale-bucket $d$ is formed of the two side plates $d'$ and the transverse plate or plates $e f$, preferably made of sheet or cast iron and of suitable form or shape, the said side plates $d'$ being suspended by one end of the scale-beam $b$, swinging on a knife-edge in the usual and well-known manner. The side plates $d'$ form the bearings for the shaft of the four-armed wheel $g$, rotating between the said plates $d'$, so that two of the four arms form with the plate $e$ a closed receptacle for collecting the material directed into the bucket by means of the plate $c$.

$i k$ designate a two-armed lever pivoted to the plate $e$, the short arm $i$ of which is designed to arrest the rotary motion of the wheel $g$, the long arm $k$ being adapted to be engaged with a part $w$ of the frame to release the said wheel when the scale-bucket moves downward. The material to be weighed will drop into the scale-bucket—that is to say, into the space formed by the plates $d' e f$ and two of the arms $q$—until its weight balances the weights $h$, suspended at the opposite end of the scale-beam $b$, when the loaded scale-bucket $d$ will descend until it assumes the position shown in Fig. 2. At the same time the plate $c$, rigidly connected with the scale-beam $b$, partakes in the swinging movement of the latter, and the end thereof passes across the outlet-opening of the hopper $a$, so that the current of material flowing from the latter will now be directed into an auxiliary receptacle $p$, arranged between the shoulders $o\ o$. The lowermost wall $n$ of the said auxiliary receptacle is pivotally connected with the frame, so as to form a flap or door adjacent to the upper part of the scale-bucket. The said flap $n$ is provided with a rearward extension, which is acted upon by an elbow-lever $l'$, pivoted to the rear part of the receptacle $p$ and provided with a counter-weight $l$, the lower end of which is formed eccentrically, the said elbow-lever being operated by the swinging scale-beam $b$.

While the material is entering the auxiliary receptacle $p$ the scale-bucket $d$ is emptied automatically in the following manner: Rigidly connected with the frame-shaped scale-beam $b$ is a pipe $q$, Figs. 3, 4, and 5, arranged on the outside of the supports $o'$ of the beam $b$, so as to swing freely with the latter, the said pipe $q$ being so arranged that it intersects the horizontal plane of the scale-beam in the direction of that end of the latter which carries the scale-bucket $d$, or, in other words, that it is inclined toward the scale-beam end. The degree of inclination (or, in other words the angle) formed by the longitudinal axis of the pipe $q$ and the plane of the scale-beam $b$ may be increased or diminished at will by the set-screws $r$ and $s$, Fig. 5, by means of which the fastening-lug $t$ of the pipe $q$ is secured to the scale-beam $b$. The screw $s$ clamps the edges of a longitudinal slot in the lug $t$, so as to allow the pipe to be raised or lowered, as desired. The pipe $q$ contains a relatively heavy ball or other rolling body P, preferably of cast-iron, which, when the scale exactly balances, as shown in Fig. 2, will move in the direction of the scale-bucket $d$ and by reason of its gravity cause the said filled bucket $d$ to descend for a farther distance. By this means the arm $k$ of the two-armed lever will be arrested by the part $w$ of the frame of the machine and will be turned on its pivot, so that the short arm $i$ will slip from under the arrested arm of the wheel $g$ and will set the same free. The said arm will under the weight of the material collected in the scale-bucket be now pushed outward and the material discharged. The emptied scale-bucket $d$ will now rise again and the two-armed lever $i\ k$ reassume its normal position, so that the next arm of the wheel $g$, rotated by the pressure of the moving material, will strike against the projecting arm $i$ and be held by the same to close the bucket $d$, while the next arm now takes the place of the bottom blade and partly closes the upper side of the said bucket. The scale-bucket $d$ being thus emptied, the end of the scale-beam $b$ carrying the weights $h$ will descend, and a projection $u$, secured to or forming part of the said weighted end of the scale-beam, will press down the end of the lever $l^*$, and by reason of the eccentricity of the counter-weight the pressure heretofore exerted upon the said extension will be relieved and the flap $n$ will be free to open under the weight of the material collected within the said auxiliary receptacle $p$, Fig. 1. The said material will therefore flow into the raised scale-bucket $d$. On the descent of the weighted end of the scale-beam $b$ the oscillating plate $c$ will be moved back into its original position and will direct the stream of the material into the bucket $d$ and break the connection between the hopper and the auxiliary receptacle $p$, and in this manner the said bucket will again be filled, as hereinbefore described.

In the modification shown in Figs. 6 and 7 of the drawings the oscillating plate $c$ is not secured to the scale-beam $b$ itself, but is pivotally connected with the stationary auxiliary receptacle $p$, and it is operated from the said beam by means of the lever-arm $b'$ and the connecting-rod $b^2$ between the beam $b$ and the plate $c$. The scale-beam $b$ in this modification acts upon the two-armed lever $u'\ l'$ by striking the said arm $u'$ on the descent of the weights and relieving the same on the descent of the filled scale-bucket $d$. The lever-arm $l'$ is made heavier than the arm $u'$ and bears against an eccentric projection or cam $n'$ on the rear side of the pivotally-suspended flap $n$ of the auxiliary receptacle $p$, thus positively closing the said flap on the descent of the scale-bucket end of the beam $b$ and allowing the said flap $n$ to open under the action of its counter-weight $n^2$ on the descent of the weighted end of the said beam.

I provide for arresting the scale-bucket $d$ after the same has been emptied automatically. In order to save room in large scales, the wheel may be omitted and be replaced by a flap or door F, oscillating on an axis journaled in bearings secured to the said scale. The said flap or door is kept closed by a hooked lever G, which, as in the form or modification hereinbefore described with reference to the lever $i\ k$, is pivoted to the body of the scale, and by the said lever striking against a fixed rest $w'$ the said flap or door is opened on the descent of the scale-bucket, thus disengaging from the end of the flap F the hooked end of the lever and allowing the said flap to open under the weight of the collected material. The flap or door F in opening will turn a cam E, rigidly secured to its oscillating shaft, and the said cam, acting upon the projecting portion of a locking-bolt B, will push or move the latter in the direction of the scale-bucket. The forward end of the bolt B rests in a slot in a sleeve D, secured to or forming part of the rod or bar $d^2$, by which the scale-bucket $d$ is suspended, the said sleeve D sliding on a bolt-like extension C of a fixed standard T. The parts are so arranged that the hook of the lever G will be withdrawn from the flap or door F after the sleeve D, descending with the bucket $d$, has slid down on the bolt C, so that the locking-bolt B will be opposite an opening provided near the upper end of the said standard-bolt C and enter the latter when the said bolt C is pushed forward by the cam E on the oscillating shaft of the flap or door F. By this means the scale-bucket $d$ is coupled for a short space of time with the fixed standard T and retained in position until the material weighed has been discharged, when the flap or door F will close again under the action of its counter-weight F' and through its oscillating shaft, and the cam E, affixed thereto, will withdraw the locking-bolt B from the opening in the standard-bolt C, so that the scale-bucket is free to rise, the flap or door having been secured by the hook of the lever G.

In cases where these improved automatic scales are intended for use in weighing ground materials—such as flour, which is liable to "stick" in the outlet-opening of the hopper $a$ and close it up—the said hopper is provided with a device for positively feeding the said material through the said opening. This device is illustrated in Figs. 8 and 9 of the drawings, and consists in a rotary drum H, secured to a shaft W, receiving its rotary motion from belt-pulleys. (Not shown in the drawings.) The said drum H is provided with the blades H', forcing the flour or other material in the direction of the opening of the hopper $a$, which just above the said opening is provided with a number of fixed scrapers I, between which the blades H' pass, so as to be freed from flour. The flour is thus compelled to fall back and drop through the outlet-opening of the hopper, as will be readily understood from the drawings.

Having fully described my invention, what I desire to claim and secure by Letters Patent is—

1. In automatic scales, an oscillating plate arranged below the outlet-opening of a receiving-hopper and moved alternately in the direction of the weighted end and in the direction of the scale-bucket end of the scale-beam by the pendulations of the latter, so that the material to be weighed will be conducted alternately into the scale-bucket direct and into an auxiliary collecting-receptacle.

2. In an automatic scale, the combination of a receiving-hopper, an oscillating scale-beam provided with an attached plate which oscillates therewith, a scale-bucket suspended by the scale-beam, an auxiliary receptacle provided at its bottom with a pivoted plate for the purpose of placing such receptacle in communication with the scale-bucket, and an automatically-operated lever for actuating the pivoted plate to conduct the material from the auxiliary receptacle into the scale-bucket, substantially as described.

3. In automatic scales, the combination of the receiving-hopper $a$, an oscillating plate $c$, connected with the scale-beam $b$ and partaking in the movements of the latter, a receptacle $p$, the balance-scale $d$, suspended at one end of the beam $b$, and the pipe $q$, having the rolling body P, substantially as and for the purpose specified.

4. In automatic scales, an auxiliary receptacle $p$, arranged above the scale-bucket and having that wall which is adjacent to the bucket constructed to form a flap or door $n$, which is closed by a lever when the scale-beam oscillates in the direction of the bucket end, and on the return movement the said beam acts upon the said lever to allow the flap to open under the pressure of the collected material, substantially as and for the purpose specified.

5. In an automatic scale, the combination of a receiver-hopper, an oscillating scale-beam having a rigidly-attached plate oscillating therewith, a scale-bucket suspended by the scale-beam and provided at its bottom with a flap or door normally retained in a closed position, and an auxiliary receptacle interposed between the scale-bucket and the receiving-hopper and provided with an opening and closing flap for delivering the material into the bucket, substantially as described.

6. In automatic scales, means for temporarily locking in position the descended scale-bucket during and for a short time after the discharge of the material, consisting of the sliding bolt B, which, by means of a cam E, secured to the rocking shaft of the flap or door F of the descended scale $d$, is pushed into a stationary bolt C, thus coupling the latter with the sleeve D of the bucket, substantially as and for the purpose specified.

7. In automatic scales, the combination of a receiving-hopper $a$, scrapers I near the outlet-opening of the same, a rotary shaft arranged above the said outlet-opening and having the blades H', an oscillating plate $c$, moving below the said outlet-opening in conformity with the movements of the scale-beam $b$, and a scale-bucket carried by the latter, substantially as and for the purposes specified.

8. In an automatic scale, the combination, with the scale-beam and scale-bucket suspended thereby, of the pipe $q$, rigidly secured to and oscillating in unison with the scale-beam, and a rolling body within the rigidly-attached pipe, substantially as described.

In testimony whereof I have signed my name to this specification in the presence of two subscribing witnesses.

FRIEDRICH CARL SCHMIDT.

Witnesses:
MORITZ FAUST,
ALFRED SCHALLER.